L. B. LITTLEJOHN.
FOUR WHEEL DRIVE.
APPLICATION FILED FEB. 7, 1920.
1,366,536.
Patented Jan. 25, 1921.
2 SHEETS—SHEET 2.
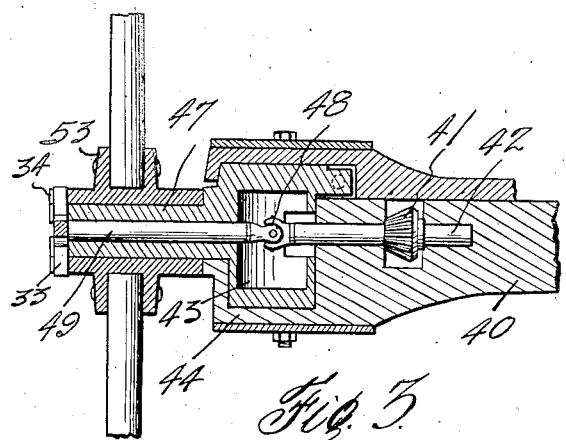
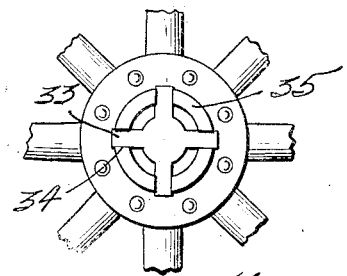
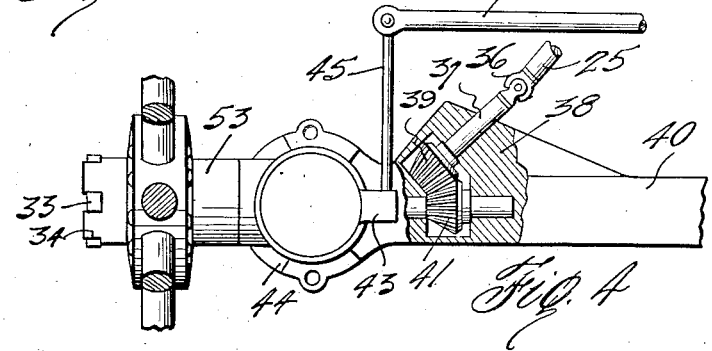
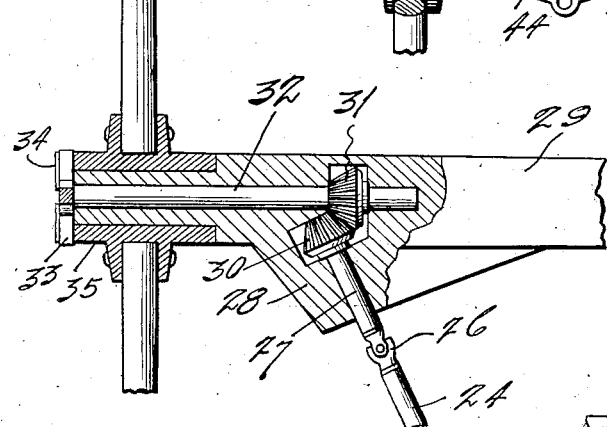
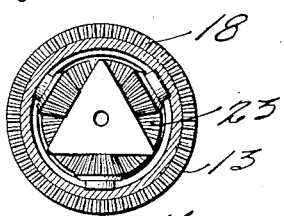
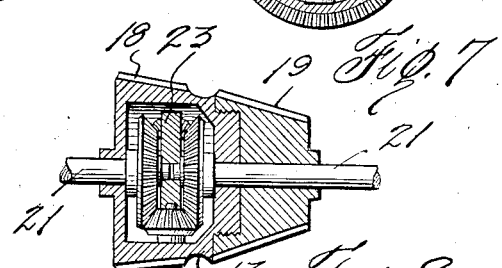
Inventor
L. B. Littlejohn,
By Jack A. Ashley
Attorney

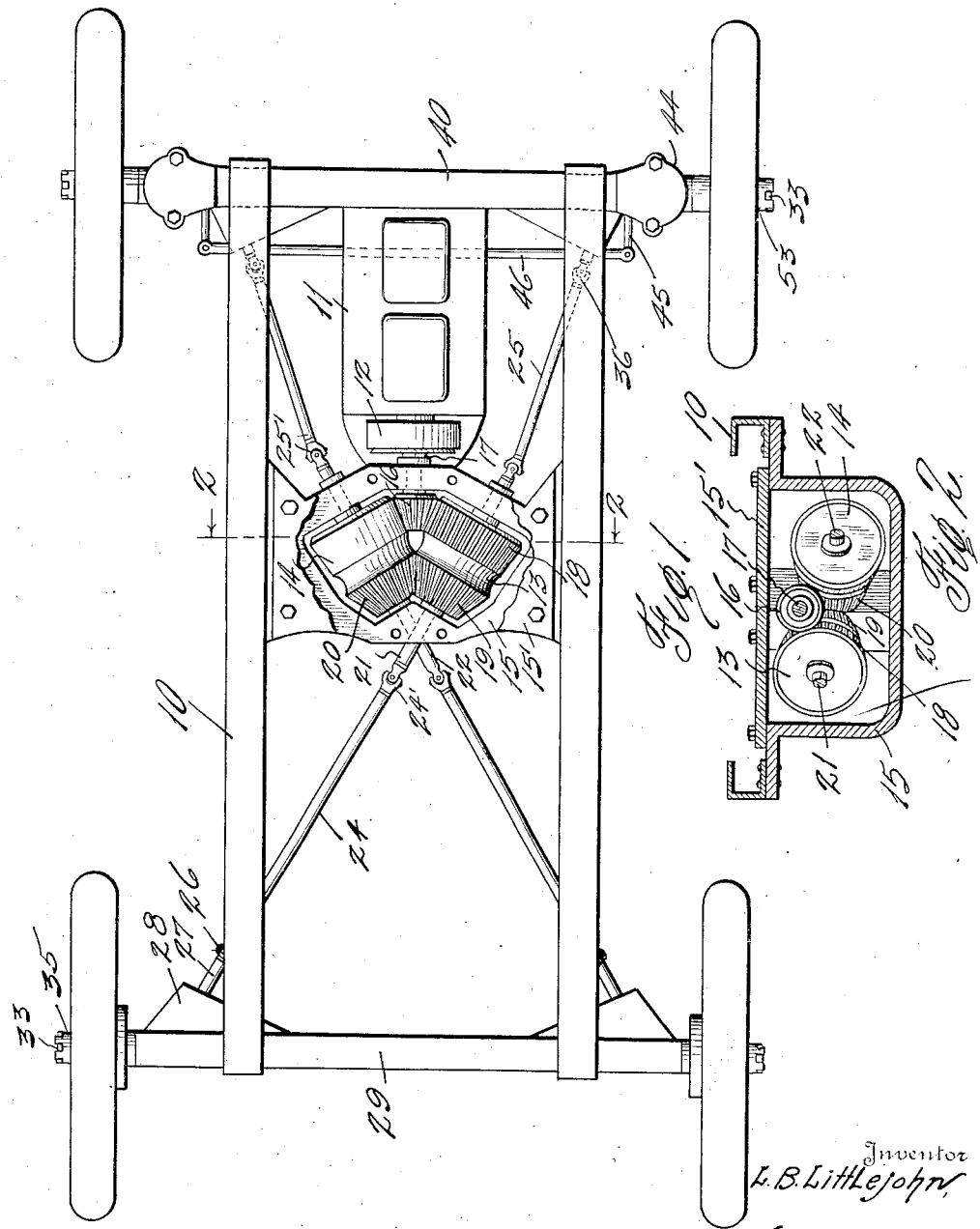

UNITED STATES PATENT OFFICE.

LONZO B. LITTLEJOHN, OF WORTHAM, TEXAS.

FOUR-WHEEL DRIVE.

1,366,536.

Specification of Letters Patent.

Patented Jan. 25, 1921.

Application filed February 7, 1920. Serial No. 356,938.

*To all whom it may concern:*

Be it known that I, LONZO B. LITTLEJOHN, a citizen of the United States, residing at Wortham, in the county of Freestone and State of Texas, have invented certain new and useful Improvements in Four-Wheel Drives, of which the following is a specification.

This invention relates to new and useful improvements in four wheel drives.

The aim of the invention is to provide a central driving unit and differential combined, and to transmit motion direct to the wheel from said unit in a simple and efficient manner. A further result sought is to attain simplicity of construction, efficiency in operation and positive driving connection.

In carrying out the invention I mount on the frames of the vehicle intermediate the front and rear axles a pair of differential housings disposed at an angle to each other and having external bevel gears in mesh whereby one housing drives the other. The driving housing is arranged to be driven by the motor through a suitable clutch and transmission device. In each housing differential gears are arranged and connected with a shaft. Each shaft has connection at its ends with propeller shafts extending diagonally of the frame and one propeller shaft driving one rear wheel and the other propeller shaft one front wheel on the opposite side from the rear wheel. The propeller shafts connect by means of universal joints with a novel form of driving means connected with the wheel.

The invention will be more readily understood from a reading of the following specification and by reference to the accompanying drawings, in which an example of the invention is shown, and wherein—

Figure 1 is a plan view of the frame and running gear of a motor vehicle equipped with propelling means constructed in accordance with my invention, Fig. 2 is a transverse sectional view on the line 2—2 of Fig. 1, Fig. 3 is a vertical sectional detail of one of the front wheel drives, Fig. 4 is a plan view of the same with a portion in section, Fig. 5 is a cross sectional detail of one of the rear wheel drives, Fig. 6 is an elevation of the hub driving connection, Fig. 7 is a cross-sectional detail through one of the differential housings, and Fig. 8 is a longitudinal sectional detail of the driving housing and its differential.

In the drawings the numeral 10 designates a motor vehicle frame which may be of any suitable construction and is provided at its forward end with a suitable motor 11. A clutch and transmission device 12 of suitable construction is mounted at the rear end of the motor. A frusto-conical differential housing 13 is correlated with a second differential housing 14 in rear of the device 12. These housings are disposed within a case 15 suspended from the frame 10 and having a cover plate 15' as is best shown in Fig. 2. The housings are disposed at an angle to each other and the housing 13 is slightly higher than the housing 14 as is clear from Fig. 2. A beveled driving pinion 16 is mounted on the rear end of a transmission shaft 17 extending from the device 12.

The pinion 16 meshes with and drives a gear ring 18 on the surface of the housing 13 which becomes the driving housing or element. The housing 13 has its rear end reduced and provided with a bevel gear ring 19 meshing with a similar gear ring 20 on the housing 14 which latter becomes the drive housing. A drive shaft 21 extends through the housing 13 and the case 15 and a second drive shaft 22 extends through the case 15 and the housing 14. As is shown in Fig. 8 each drive shaft comprises two sections connected with a differential driving gear 23 of a suitable construction such as is illustrated in Figs. 7 and 8 and forms no particular part of the invention as it may be varied to suit the fancy of the builder. To the rear end of each drive shaft a rear propeller shaft 24 is connected by a universal joint 24'; while to the front end of each drive shaft a front propeller shaft 25 is connected by a universal joint 25'. The shaft 24 connected with the drive shaft 21 drives the left hand rear wheel; while the front shaft 25 connected with the drive shaft 21 drives the front right hand wheel. The other two wheels are driven by the other shaft. It will be seen that the drive shafts are crossed and the driving elements are thus disposed diagonally. Each propeller shaft 24 is connected at its rear end by means of a universal joint 26 with a stub shaft 27 mounted in a boss 28 on the rear axle 29. A bevel gear 30 on the rear end of the shaft 27 drives a bevel gear 31 on a counter shaft 32 mounted axially of the axle 29 and extending through the end thereof as is shown best in Fig. 5.

A spider 33 is fastened on the end of the shaft 32 and is seated in notches 34 in the outer end of the hub 35 of the rear wheel. In this way motion is transmitted directly to the hub of the wheel. A different construction is required for the front wheels as the same must be plum for steering. Each front propeller shaft 25 is connected with a stub shaft 37 by means of a universal joint 36. The stub shaft 37 is mounted in a boss 38 on the front axle 40 and carries a bevel pinion 39 which meshes with a bevel pinion 41. As is shown in detail in Figs. 3 and 4 each pinion 41 is mounted on a counter shaft 42 which is mounted in the axle 40. The axle has a socket head 44 at each end and in each socket a cylindrical spindle head 43 is mounted to rotate. Each spindle head is hollow or tubular and carries a spindle 47.

A rigid arm 45 extends from the top of each spindle head and is pivoted to a connecting rod 46 which in turn has connection with the steering gear and is swung thereby so as to swing the arm 45 and thus rotate the spindle head and thereby swings the wheels. The shaft 42 is connected with an extension 49 by means of a universal joint 48 which is located at the center of each spindle head. Each extension 49 passes through the spindle 47 and has fixed on its end one of the spiders 33 which engages in the notches 34 in the end of the hub 53 of the front wheel. It will be seen that the universal joint 48 permits the front wheels to turn freely. It is believed the practicability and simplicity of this construction will be obvious from the foregoing description. It is pointed out that the axles may be made very strong and the absence of differential housing is an advantage.

The driving mechanism at the differential housing within the case 15 is compact and these housings may revolve constantly in a bath of oil.

What I claim, is:

1. In a four wheel drive, the combination with a frame, front and rear axles supporting the frame, wheels supporting the axles, a motor mounted on the frame, and a transmission gear driven by the motor, of a pair of differential devices one of which is driven by the other and one of which is driven by the transmission gear, propeller shafts extending forwardly and rearwardly of the differential devices and driven thereby, and driving connections between the propeller shafts and the front and rear wheels, the propeller shafts being disposed in diagonal relation whereby the propeller shaft which drives one wheel has correlated with it a propeller shaft driving a wheel on the opposite side and at the opposite end of the same, said propeller shaft including universal joints whereby they are connected with their component element.

2. In a four wheel drive, the combination with a frame, front and rear axles supporting the frame, wheels supporting the axles. a motor mounted on the frame, and a transmission gear driven by the motor, a driving differential housing connected with the transmission gear and having a driving element, a driven differential housing connected with the driving element of the first named housing, a differential mechanism in each housing, drive shaft sections extending into each housing and connected with the differential mechanism therein, the sets of drive shaft sections being disclosed in diagonal relation to each other, front and rear propeller shafts having pivotal connection with the drive shaft sections, and driving connections between the propeller shafts and the front and rear wheels.

3. In a four wheel drive, the combination with a motor driven element, of a differential housing having exterior driving connection with said element, a second differential housing having exterior driving connection with the first named housing, a differential mechanism in each housing, drive shaft sections extending into each housing and connected with the differential mechanism therein, and means for transmitting motion from the drive shaft sections to the four wheels of the vehicle.

4. In a differential drive for a motor vehicle, the combination with a motor driven beveled gear, of a differential housing, an external gear ring on said housing meshing with the driving gear of the motor, a bevel gear on the said housing, a second differential housing, a bevel gear on the second housing meshing and driven by the bevel gear of the first housing, differential mechanism in each housing, drive shafts extending into the housings and connected with the differential mechanisms, and driving connections between the ends of the drive shafts and the four wheels of the motor vehicle.

5. In a four wheel drive, a support, a pair of differential housings associated with the support and diagonally arranged with relation to each other, said housings being provided at the same ends with engaging gears, means to drive one housing, differential mechanisms within said housings, and means for connecting the mechanisms with the four wheels of the vehicle.

In testimony whereof I affix my signature.

LONZO B. LITTLEJOHN.